(12) United States Patent
Jollis et al.

(10) Patent No.: US 8,364,982 B2
(45) Date of Patent: Jan. 29, 2013

(54) WIRELESS RECEIVER AND METHODS FOR STORING CONTENT FROM RF SIGNALS RECEIVED BY WIRELESS RECEIVER

(75) Inventors: Roger A. Jollis, Leawood, KS (US); Thomas R. Denton, Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 1278 days.

(21) Appl. No.: 11/865,311

(22) Filed: Oct. 1, 2007

(65) Prior Publication Data
US 2010/0268962 A1 Oct. 21, 2010

(51) Int. Cl.
*G06F 11/30* (2006.01)
*G06F 12/14* (2006.01)
*H04L 9/00* (2006.01)
(52) U.S. Cl. ............................ 713/193; 713/192; 380/45
(58) Field of Classification Search .................. 713/192, 713/193; 380/45
See application file for complete search history.

(56) References Cited

U.S. PATENT DOCUMENTS

| | | | |
|---|---|---|---|
| 6,779,115 B1 * | 8/2004 | Naim | 713/192 |
| 7,069,449 B2 * | 6/2006 | Weaver et al. | 713/193 |
| 2005/0147247 A1 * | 7/2005 | Westberg et al. | 380/200 |
| 2005/0289625 A1 * | 12/2005 | Takagi et al. | 725/100 |
| 2006/0052144 A1 | 3/2006 | Seil et al. | |
| 2008/0064326 A1 * | 3/2008 | Foster et al. | 455/3.06 |
| 2008/0263366 A1 * | 10/2008 | G | 713/190 |

\* cited by examiner

Primary Examiner — Kambiz Zand
Assistant Examiner — Benjamin Kaplan
(74) Attorney, Agent, or Firm — J. Gordon Lewis

(57) ABSTRACT

A wireless receiver and methods for storing content from RF signals received by the wireless receiver are provided. The wireless receiver includes a microprocessor and an RF receiver configured to operably communicate with the microprocessor. The RF receiver is configured to receive an RF signal having digital content therein. The wireless receiver further includes a detachable memory device configured to operably communicate with the microprocessor. The detachable memory device has a unique serial number stored therein. The microprocessor is configured to retrieve the unique serial number from the detachable memory device. The microprocessor is further configured to receive the digital content from the RF receiver and to encrypt the digital content utilizing the unique serial number to obtain encrypted digital content. The microprocessor is further configured to store the encrypted digital content on the detachable memory device.

11 Claims, 4 Drawing Sheets

US 8,364,982 B2

WIRELESS RECEIVER AND METHODS FOR STORING CONTENT FROM RF SIGNALS RECEIVED BY WIRELESS RECEIVER

BACKGROUND

Wireless receivers such as satellite radios have been implemented. However, there is not currently a mechanism that permits the removable/transportable storage of content protecting copyright owner rights as it applies to the recording of digital content.

SUMMARY

A wireless receiver in accordance with an exemplary embodiment is provided. The wireless receiver includes a microprocessor and an RF receiver configured to operably communicate with the microprocessor. The RF receiver is configured to receive an RF signal having digital content therein. The RF receiver has a first unique serial number stored therein. The wireless receiver further includes a detachable memory device configured to operably communicate with the microprocessor. The detachable memory device has a second unique serial number stored therein. The microprocessor is configured to retrieve the first and second unique serial numbers from the RF receiver and the detachable memory device, respectively. The microprocessor is further configured to receive the digital content from the RF receiver and to encrypt the digital content utilizing the first and second unique serial numbers to obtain encrypted digital content. The microprocessor is further configured to store the encrypted digital content on the detachable memory device.

A method for storing content from an RF signal utilizing a wireless receiver in accordance with another exemplary embodiment is provided. The wireless receiver has a microprocessor, an RF receiver, and a detachable memory device. The microprocessor is configured to operably communicate with the RF receiver and the detachable memory device. The RF receiver has a first unique serial number stored therein. The detachable memory device has a second unique serial number stored therein. The method includes receiving the RF signal having digital content therein, utilizing the RF receiver. The method further includes retrieving the first and second unique serial numbers from the RF receiver and the detachable memory device, respectively, utilizing the microprocessor. The method further includes receiving the digital content from the RF receiver at the microprocessor. The method further includes encrypting the digital content based on both the first and second unique serial numbers to obtain encrypted digital content, utilizing the microprocessor. The method further includes storing the encrypted digital content on the detachable memory device, utilizing the microprocessor.

A wireless receiver in accordance with another exemplary embodiment is provided. The wireless receiver includes a microprocessor and an RF receiver configured to operably communicate with the microprocessor. The RF receiver is configured to receive an RF signal having digital content therein. The wireless receiver further includes a detachable memory device configured to operably communicate with the microprocessor. The detachable memory device has a unique serial number stored therein. The microprocessor is configured to retrieve the unique serial number from the detachable memory device. The microprocessor is further configured to receive the digital content from the RF receiver and to encrypt the digital content utilizing the unique serial number to obtain encrypted digital content. The microprocessor is further configured to store the encrypted digital content on the detachable memory device.

A method for storing content from an RF signal utilizing a wireless receiver in accordance with another exemplary embodiment is provided. The wireless receiver has a microprocessor, an RF receiver, and a detachable memory device. The microprocessor is configured to operably communicate with the RF receiver and the detachable memory device. The detachable memory device has a unique serial number stored therein. The method includes receiving the RF signal having digital content therein, utilizing the RF receiver. The method further includes retrieving the unique serial number from the detachable memory device, respectively, utilizing the microprocessor. The method further includes receiving the digital content from the RF receiver at the microprocessor. The method further includes encrypting the digital content based on the unique serial number to obtain encrypted digital content, utilizing the microprocessor. The method further includes storing the encrypted digital content on the detachable memory device, utilizing the microprocessor.

A wireless receiver in accordance with another exemplary embodiment is provided. The wireless receiver includes a microprocessor and an RF receiver configured to operably communicate with the microprocessor. The RF receiver is configured to receive an RF signal having digital content therein. The RF receiver has a unique serial number stored therein. The wireless receiver further includes a detachable memory device configured to operably communicate with the microprocessor. The microprocessor is configured to retrieve the unique serial number from the RF receiver. The microprocessor is further configured to receive the digital content from the RF receiver and to encrypt the digital content utilizing the unique serial number to obtain encrypted digital content. The microprocessor is further configured to store the encrypted digital content on the detachable memory device.

A method for storing content from an RF signal utilizing a wireless receiver in accordance with another exemplary embodiment is provided. The wireless receiver has a microprocessor, an RF receiver, and a detachable memory device. The microprocessor is configured to operably communicate with the RF receiver and the detachable memory device. The RF receiver has a unique serial number stored therein. The method includes receiving the RF signal having digital content therein, utilizing the RF receiver. The method further includes retrieving the unique serial number from the RF receiver, respectively, utilizing the microprocessor. The method further includes receiving the digital content from the RF receiver at the microprocessor. The method further includes encrypting the digital content based on the unique serial number to obtain encrypted digital content, utilizing the microprocessor. The method further includes storing the encrypted digital content on the detachable memory device, utilizing the microprocessor.

DESCRIPTION OF EXEMPLARY EMBODIMENTS

Figure 1:
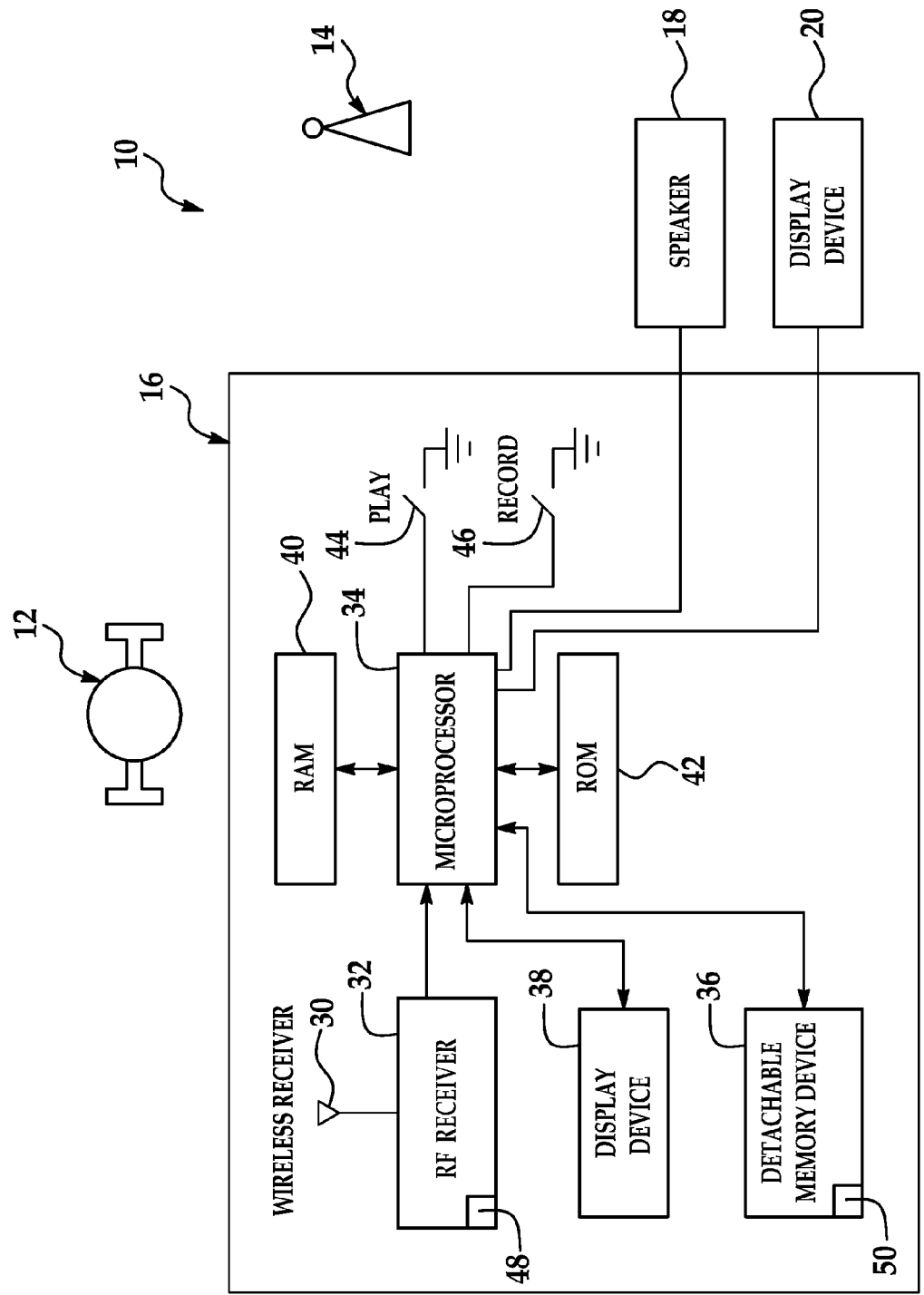
FIG. 1 is a schematic of communication system having a wireless receiver in accordance with an exemplary embodiment.

Referring to FIG. 1, a communication system 10 having a wireless receiver 16 in accordance with an exemplary embodiment is illustrated. The communication system 10 further includes a satellite 12, a ground-based transmitter 14, an electrical speaker 18, and a display device 20.

The satellite 12 is provided to transmit RF signals having digital content to the wireless receiver 16. The digital content comprises at least one of digital audio content and digital video content.

The ground-based transmitter 14 is provided to transmit RF signals having digital content to the wireless receiver 16. The digital content comprises at least one of digital audio content and digital video content or other valuable digital content (e.g., books, photographs).

The wireless receiver 16 is provided to receive RF signals from the satellite 12 or the ground-based transmitter 14, and to decrypt the digital content if needed from the satellite 12, and to securely store digital content from the RF signals. The wireless receiver 16 includes an antenna 30, an RF receiver 32, a microprocessor 34, a detachable memory device 36, a display device 38, a random access memory (RAM) 40, a read-only memory (ROM) 42, and switches 44, 46.

The antenna 30 is operably coupled to the RF receiver 32 and is configured to receive RF signals from the satellite 12 and the ground-based transmitter 14. The RF receiver 32 is configured to receive the RF signals from the antenna 30 and to transmit digital content from the RF signals to the microprocessor 34.

The microprocessor 34 is provided to store digital content received from the RF receiver 32 in the detachable memory device 36. The microprocessor 34 is operably coupled to the RF receiver 32, the detachable memory device 36, the display device 38, the ROM 40, and the ROM 42.

In one exemplary embodiment, when the microprocessor 34 detects that a switch 46 has a closed operational position, the microprocessor 34 encrypts the digital content received from the RF receiver 32 utilizing (i) a unique serial number 48 stored in the RF receiver 32, and (ii) a unique serial number 50 stored in the detachable memory device 36. A substantial advantage of utilizing the unique serial number 50 to encrypt the digital content, is that it prevents unauthorized access to the digital content if the encrypted digital content is copied from the detachable memory device 36 to another memory device, because the digital content could not be decrypted from the other memory device since the other memory device would not have the unique serial number 50. Further, another substantial advantage of utilizing the unique serial number 48 to encrypt the digital content is that that the encrypted digital content could not be decrypted by a wireless receiver that does not have the RF receiver 32, since other RF receivers would not have the unique serial number 48. The microprocessor 34 can utilize any known encryption algorithm to encrypt the digital content. For example, the microprocessor 34 can utilize one or more of the following encryption algorithms: (i) RSA, (ii) RC4, and (iii) Blowfish. The microprocessor 34 is further configured to store the encrypted digital content in the detachable memory device 36. Further, when the microprocessor 34 detects that a switch 44 has a closed operational position, the microprocessor 34 retrieves the encrypted digital content from the detachable memory device 36 and decrypts the digital content utilizing the unique serial numbers 48, 50. Thereafter, the microprocessor 34 determines whether the digital content comprises digital audio content or digital video content. If the digital content comprises digital audio content, the microprocessor 34 induces the speaker 18 to emit sound based upon the digital audio content. If the digital content comprises digital video content, the microprocessor induces the display device 22 display images based upon the digital video content, and may further induce the speaker 18 to emit sound.

In another exemplary embodiment, when the microprocessor 34 detects that a switch 46 has a closed operational position, the microprocessor 34 encrypts the digital content received from the RF receiver 32 utilizing the unique serial number 50 stored in the detachable memory device 36. A substantial advantage of utilizing the unique serial number 50 to encrypt the digital content, is that it prevents unauthorized access to the digital content if the encrypted digital content is copied from the detachable memory device 36 to another memory device, because the digital content could not be decrypted from the other memory device since the other memory device would not have the unique serial number 50. The microprocessor 34 is further configured to store the encrypted digital content in the detachable memory device 36. Further, when the microprocessor 34 detects that a switch 44 has a closed operational position, the microprocessor 34 retrieves the encrypted digital content from the detachable memory device 36 and decrypts the digital content utilizing the unique serial number 50. Thereafter, the microprocessor 34 determines whether the digital content comprises digital audio content or digital video content. If the digital content comprises digital audio content, the microprocessor 34 induces the speaker 18 to emit sound based upon the digital audio content. If the digital content comprises digital video content, the microprocessor induces the display device 22 display images based upon the digital video content, and may further induce the speaker 18 to emit sound.

In yet another exemplary embodiment, when the microprocessor 34 detects that a switch 46 has a closed operational position, the microprocessor 34 encrypts the digital content received from the RF receiver 32 utilizing the unique serial number 48 stored in the RF receiver 32. A substantial advantage of utilizing the unique serial number 48 to encrypt the digital content is that that the encrypted digital content could not be decrypted by a wireless receiver that does not have the RF receiver 32, since other RF receivers would not have the unique serial number 48. The microprocessor 34 is further configured to store the encrypted digital content in the detachable memory device 36. Further, when the microprocessor 34 detects that a switch 44 has a closed operational position, the microprocessor 34 retrieves the encrypted digital content from the detachable memory device 36 and decrypts the digital content utilizing the unique serial number 48. Thereafter, the microprocessor 34 determines whether the digital content comprises digital audio content or digital video content. If the digital content comprises digital audio content, the microprocessor 34 induces the speaker 18 to emit sound based upon the digital audio content. If the digital content comprises digital video content, the microprocessor induces the display device 22 display images based upon the digital video content, and may further induce the speaker 18 to emit sound.

The detachable memory device 36 is provided to receive encrypted digital content from the microprocessor 34 and to store the encrypted digital content therein. In one exemplary embodiment, the detachable memory device 36 is a flash memory. Of course, in alternative embodiments, the detachable memory device 36 can comprise any nonvolatile memory device known to those skilled in the art. The detachable memory device 36 also stores a unique serial number 50 therein that is accessible by the microprocessor 34.

The display device 38 is provided to display operational parameter data associated with the digital content received by the microprocessor 34. For example, when the microprocessor 34 receives digital audio content, the microprocessor 34 can induce a display device 38 to display information associated with the digital audio content including for example: (i) a song title, (ii) an artist name, and (iii) a music genre.

The RAM 40 and the ROM 42 are provided to store software algorithms and data for implementing the methods described herein. The RAM 40 and the ROM 42 are operably coupled to the microprocessor 34.

The switch 44 is provided to induce the microprocessor 34 to retrieve encrypted digital content from the detachable memory device 36 and to decrypt the encrypted digital content to obtain the digital content. The switch 46 is provided to induce the microprocessor 34 to encrypt digital content received from the RF receiver 32 and to store the encrypted digital content in the detachable memory device 36.

The electrical speaker 18 is provided to emit sound based upon digital audio content received by the microprocessor 34. The display device 20 is provided to display images based upon digital video content received by the microprocessor 34.

Figure 2:
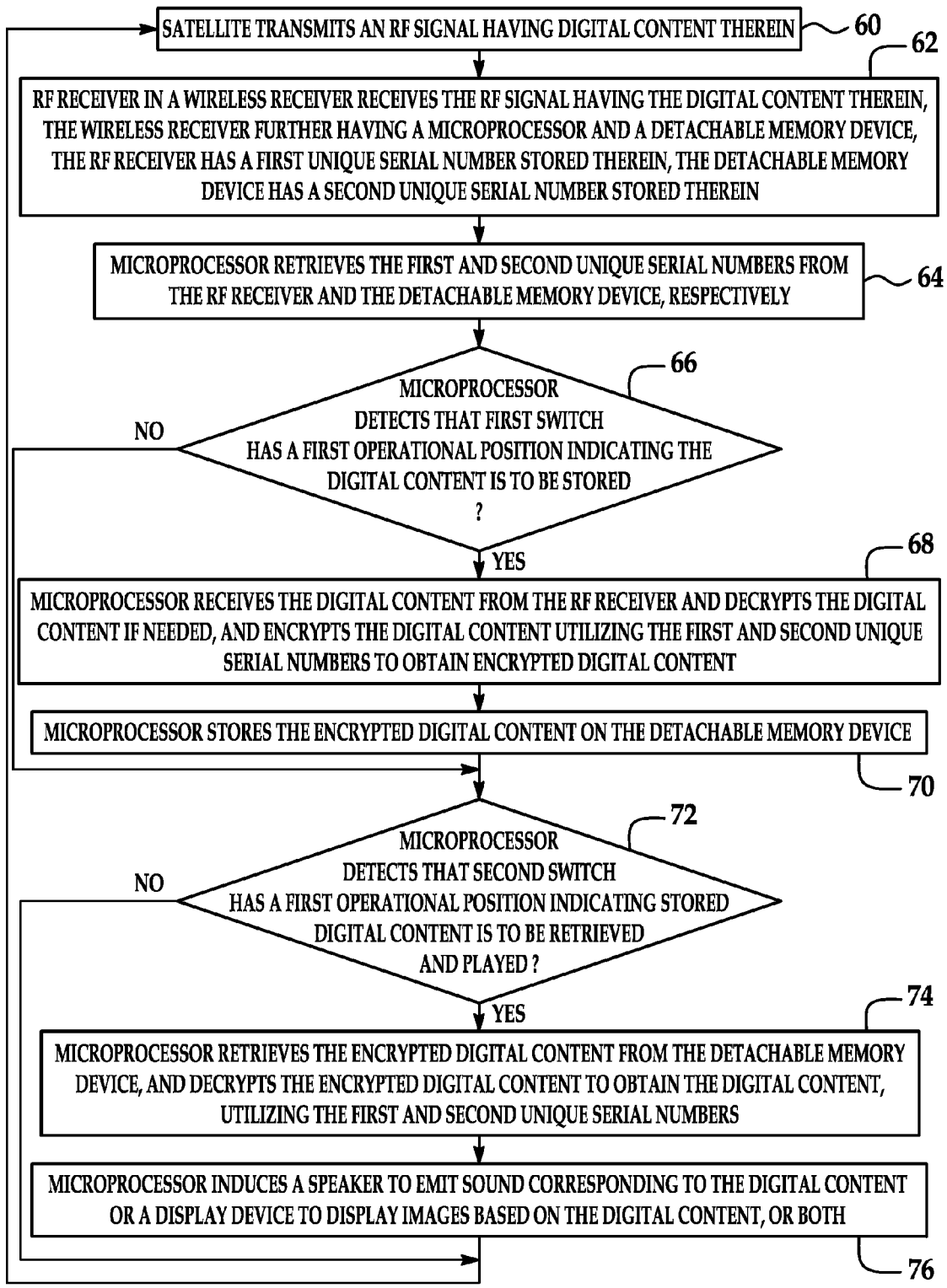
FIG. 2 is a flowchart of a method for storing content from an RF signal in accordance with another exemplary embodiment.

Referring to FIG. 2, a flowchart of a method for storing digital content from RF signals in accordance with another exemplary embodiment will now be explained. It should be noted that a satellite 12 will be utilized to transmit the RF signal received by the wireless receiver in the following flowchart. However, in an alternative embodiment, the ground-based transmitter 14 could be utilized to transmit the RF signals received by the wireless receiver 16 instead of the satellite 12.

At step 60, the satellite 12 transmits an RF signal having digital content therein.

At step 62, the RF receiver 32 in the wireless receiver 16 receives the RF signal having the digital content therein. The wireless receiver 16 further includes the microprocessor 34 and the detachable memory device 36. The RF receiver 32 has the unique serial number 48 stored therein. The detachable memory device 36 has the unique serial number 50 stored therein.

At step 64, the microprocessor 34 retrieves the unique serial numbers 48, 50 from the RF receiver 32 and the detachable memory device 36, respectively.

At step 66, the microprocessor 34 makes a determination as to whether the switch 46 has a first operational position indicating the digital content is to be stored. If the value of step 66 equals "yes", the method advances to step 68. Otherwise, the method advances to step 72.

At step 68, the microprocessor 34 receives the digital content from the RF receiver 32, and decrypts the digital content if needed, and encrypts the digital content utilizing the unique serial numbers 48, 50 to obtain encrypted digital content.

At step 70, the microprocessor 34 stores the encrypted digital content on the detachable memory device 36.

At step 72, the microprocessor 34 makes a determination as to whether the switch 44 has a first operational position indicating stored digital content is to be retrieved and played. If the value of step 72 equals "yes", the method advances to step 74. Otherwise, the method returns to step 60.

At step 74, the microprocessor 34 retrieves the encrypted digital content from the detachable memory device 36, and decrypts the encrypted digital content to obtain the digital content, utilizing the unique serial numbers 48, 50.

At step 76, the microprocessor 34 induces the speaker 18 to emit sound corresponding to the digital content or the display device 20 to display images based on the digital content, or both. After step 76, the method returns to step 60.

Figure 3:
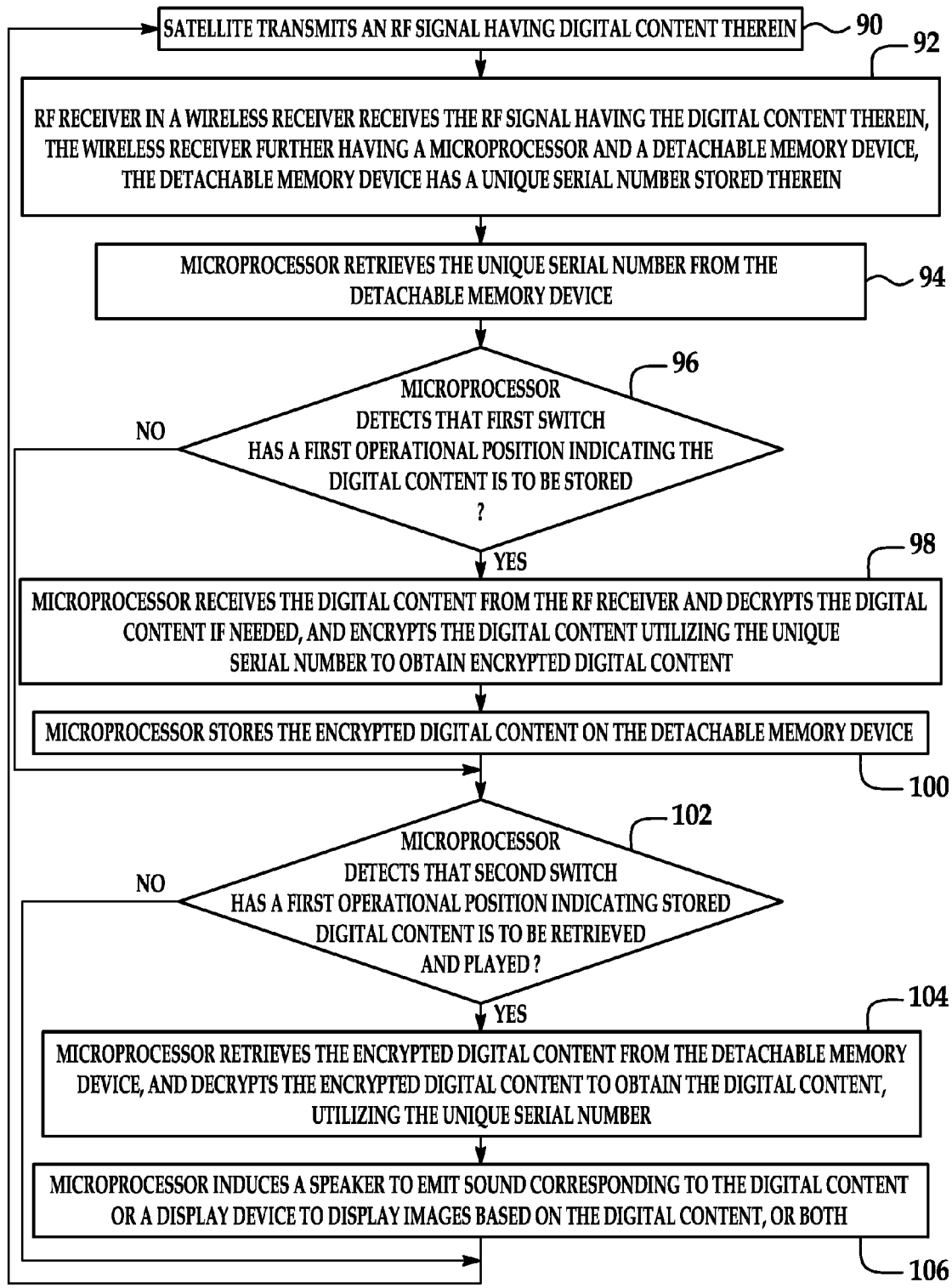
FIG. 3 is a flowchart of a method for storing content from an RF signal in accordance with another exemplary embodiment.

Referring to FIG. 3, a flowchart of a method for storing digital content from RF signals in accordance with another exemplary embodiment will now be explained. It should be noted that a satellite 12 will be utilized to transmit the RF signal received by the wireless receiver in the following flowchart. However, in an alternative embodiment, the ground-based transmitter 14 could be utilized to transmit the RF signals received by the wireless receiver 16 instead of the satellite 12.

At step 90, the satellite 12 transmits an RF signal having digital content therein.

At step 92, the RF receiver 32 in the wireless receiver 16 receives the RF signal having the digital content therein. The wireless receiver further includes the microprocessor 34 and the detachable memory device 36. The detachable memory device has the unique serial number 50 stored therein.

At step 94, the microprocessor 34 retrieves the unique serial number 50 from the detachable memory device 36.

At step 96, the microprocessor 34 makes a determination as to whether the switch 46 has a first operational position indicating the digital content is to be stored. If the value of step 96 equals "yes", the method advances to step 98. Otherwise, the method advances to step 102.

At step 98, the microprocessor 34 receives the digital content from the RF receiver 32, and decrypts the digital content if needed, and encrypts the digital content utilizing the unique serial number 50 to obtain encrypted digital content.

At step 100, the microprocessor 34 stores the encrypted digital content on the detachable memory device 36.

At step 102, the microprocessor 34 makes a determination as to whether the switch 44 has a first operational position indicating stored digital content is to be retrieved and played. If the value of step 102 equals "yes", the method advances to step 104. Otherwise, the method returns to step 90.

At step 104, the microprocessor 34 retrieves the encrypted digital content from the detachable memory device 36, and decrypts the encrypted digital content to obtain the digital content, utilizing the unique serial number 50.

At step 106, the microprocessor 34 induces the speaker 18 to emit sound corresponding to the digital content or the display device 20 to display images based on the digital content, or both.

Figure 4:
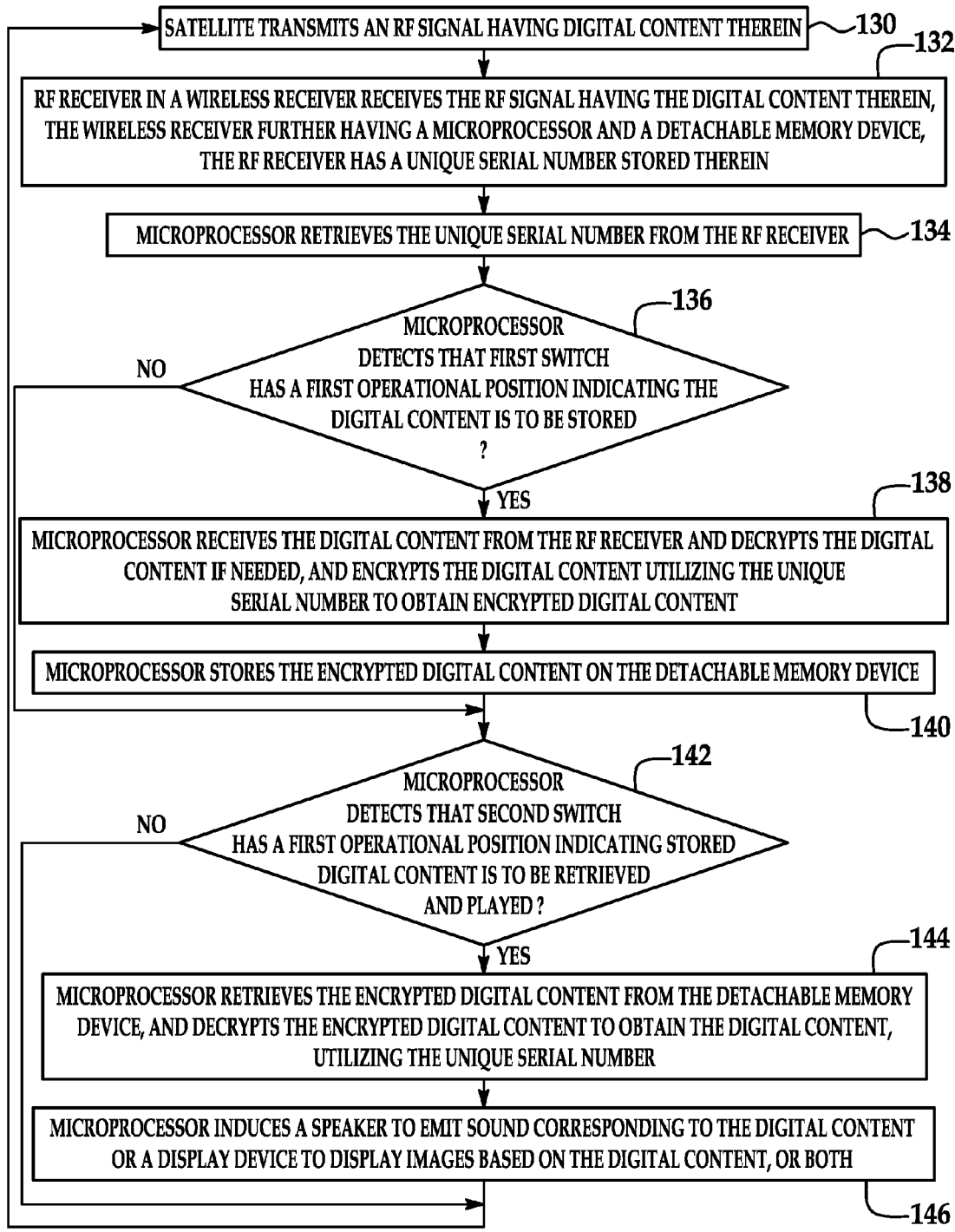
FIG. 4 is a flowchart of a method for storing content from an RF signal in accordance with another exemplary embodiment.

Referring to FIG. 4, a flowchart of a method for storing digital content from RF signals in accordance with another exemplary embodiment will now be explained. It should be noted that a satellite 12 will be utilized to transmit the RF signal received by the wireless receiver in the following flowchart. However, in an alternative embodiment, the ground-based transmitter 14 could be utilized to transmit the RF signals received by the wireless receiver 16 instead of the satellite 12.

At step 130, the satellite 12 transmits an RF signal having digital content therein At step 132, the RF receiver 32 in a wireless receiver 16 receives the RF signal having the digital content therein. The wireless receiver 16 further includes the microprocessor 34 and the detachable memory device 36. The RF receiver 32 has a unique serial number stored therein.

At step 134, the microprocessor 34 retrieves the unique serial number from the RF receiver 32.

At step 136, the microprocessor 34 makes a determination as to whether the switch 46 has a first operational position indicating the digital content is to be stored. If the value of step 136 equals "yes", the method advances to step 138. Otherwise, the method advances to step 142.

At step 138, the microprocessor 34 receives the digital content from the RF receiver 32, and decrypts the digital content if needed, and encrypts the digital content utilizing the unique serial number to obtain encrypted digital content. After step 138, the method advances to step 140.

At step 140, the microprocessor 34 stores the encrypted digital content on the detachable memory device 36. After step 140, method advances to step 142.

At step 142, the microprocessor 34 makes a determination as to whether the switch 44 has a first operational position indicating stored digital content is to be retrieved and played. If the value of step 142 equals "yes", the method advances to step 144. Otherwise, the method returns to step 130.

At step 144, the microprocessor 34 retrieves the encrypted digital content from the detachable memory device 36, and decrypts the encrypted digital content to obtain the digital content, utilizing the unique serial number.

At step 146, the microprocessor 34 induces the speaker 18 to emit sound corresponding to the digital content or the display device 20 to display images based on the digital content, or both. After step 146, the method advances to step 130.

The wireless receiver and methods provide a substantial advantage of other systems and methods. In particular, the wireless receiver and methods provide a technical effect of utilizing at least a unique serial number associated with a detachable memory device or an RF receiver, or both, to encrypt digital content stored on the detachable memory device.

As described above, the above-described methods can be embodied in the form of computer-implemented software algorithms and apparatuses for practicing those processes. In an exemplary embodiment, the methods are at least partially embodied in computer program code executed by one or more elements. The present methods may be embodied in the form of computer program code containing instructions stored in tangible media, such as floppy diskettes, CD-ROMs, hard drives, flash memory, or any other computer-readable storage medium, wherein, when the computer program code is loaded into and executed by a computer or microprocessor, the computer or microprocessor becomes an apparatus for practicing the invention.

We claim:

1. A wireless receiver, comprising:
   a microprocessor;
   an RF receiver configured to operably communicate with the microprocessor, the RF receiver configured to receive an RF signal having digital content therein, the RF receiver having a first unique serial number stored therein as a first encryption authorization key;
   a detachable memory device configured to operably communicate with the microprocessor, the detachable memory device having a second unique serial number stored therein as a second encryption authorization key; and
   the microprocessor configured to retrieve the first and second unique serial numbers from the RF receiver and the detachable memory device, respectively, the microprocessor further configured to receive the digital content from the RF receiver and to encrypt the digital content utilizing both the first and second unique serial numbers as said first and second encryption authorization keys, respectively, to obtain encrypted digital content, the microprocessor further configured to store the encrypted digital content on the detachable memory device.

2. The wireless receiver of claim 1, wherein the microprocessor is further configured to retrieve the encrypted digital content from the detachable memory device, the microprocessor further configured to decrypt the encrypted digital content to obtain the digital content, utilizing the first and second unique serial numbers.

3. The wireless receiver of claim 2, further comprising a switch operably coupled to the microprocessor, wherein the microprocessor is configured to retrieve the encrypted digital content from the detachable memory device and to decrypt the encrypted digital content to obtain the digital content, when the switch has a first operational position.

4. The wireless receiver of claim 2, wherein the digital content comprises digital audio content, the microprocessor further configured to induce a speaker to emit sound based on the digital audio content.

5. The wireless receiver of claim 2, wherein the digital content comprises digital video content, the microprocessor further configured to induce a display device to display images based on the digital video content.

6. The wireless receiver of claim 1, wherein the digital content comprises at least one of digital video content and digital audio content.

7. The wireless receiver of claim 1, further comprising a switch operably coupled to the microprocessor, the microprocessor further configured to store the encrypted digital content on the detachable memory device when the switch has a first operational position.

8. A method for storing content from an RF signal utilizing a wireless receiver, the wireless receiver having a microprocessor, an RF receiver, and a detachable memory device, the microprocessor is configured to operably communicate with the RF receiver and the detachable memory device, the RF receiver having a first unique serial number stored therein as a first encryption authorization key, the detachable memory device having a second unique serial number stored therein as a second encryption authorization key, the method comprising:
   receiving the RF signal having digital content therein, utilizing the RF receiver;
   retrieving the first and second unique serial numbers from the RF receiver and the detachable memory device, respectively, utilizing the microprocessor;
   receiving the digital content from the RF receiver at the microprocessor;
   encrypting the digital content as a function of both the first and second unique serial numbers as said first and second encryption authorization keys, respectively, to obtain encrypted digital content, utilizing the microprocessor; and
   storing the encrypted digital content on the detachable memory device, utilizing the microprocessor.

9. The method of claim 8, further comprising:
   retrieving the encrypted digital content from the detachable memory device, utilizing the microprocessor; and
   decrypting the encrypted digital content to obtain the digital content utilizing the microprocessor.

10. The method of claim 9, wherein the digital content comprises digital audio content, the method further comprising inducing a speaker to emit sound based on the digital audio content, utilizing the microprocessor.

11. The method of claim 9, wherein the digital content comprises digital video content, the method further comprising inducing a display device to display images based on the digital video content, utilizing the microprocessor.

* * * * *